March 8, 1960 E. R. PRICE 2,927,668
SWITCH CONTROL MECHANISM
Original Filed March 13, 1951
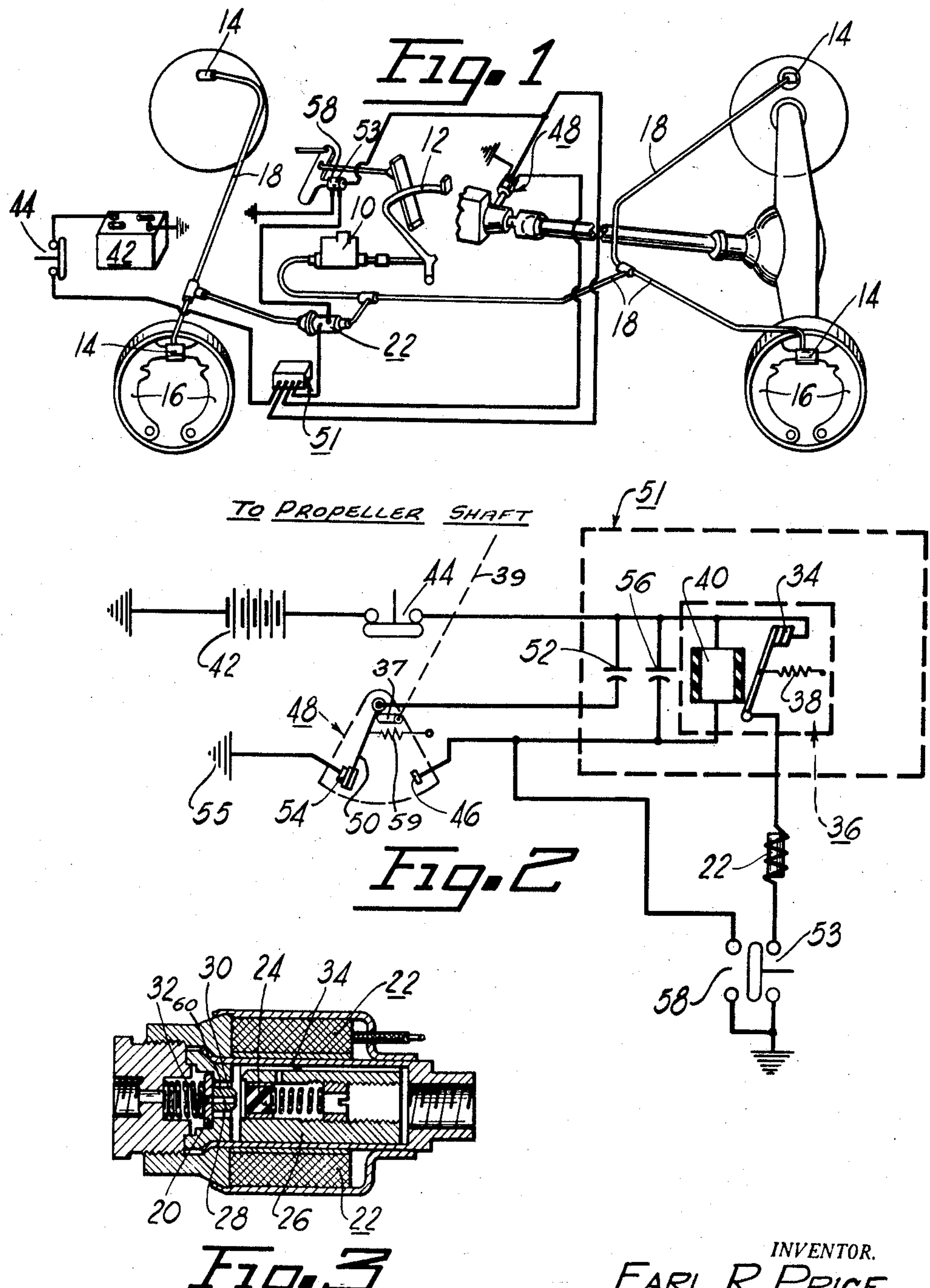
INVENTOR.
EARL R. PRICE
BY H. O. Clayton
ATTORNEY 2,927,668
Patented Mar. 8, 1960

2,927,668

SWITCH CONTROL MECHANISM

Earl R. Price, South Bend, Ind., assignor to Bendix Aviation Corporation, South Bend, Ind., a corporation of Delaware Continuation of application Serial No. 215,372, March 13, 1951. This application June 27, 1956, Serial No. 594,270

9 Claims. (Cl. 192—3)

This invention relates in general to switch controlling means and more particularly to a power operated time control means for controlling the operation of a switch. The present application is a continuation of my copending application Serial No. 215,372 entitled, "Switch Control Mechanism," filed March 13, 1951, now abandoned.

In certain arts, for example, any one of the automotive brake control art or the stamping press art, it is desirable to control the time of operation of a brake mechanism in its operation of either maintaining a certain mass static after said mass is brought to a stop or its operation of bringing said mass to a stop in which case the brake mechanism is applied while the mass is still in motion. It is accordingly an object of my invention to effect this end and this may be done by the provision of a simple, compact and easily serviced switch controlling electrical means including a relay the switch of the relay serving as a part of the means being controlled, i.e., an anti-creep mechanism of the brake system of an automotive vehicle. With this adaptation of my invention there is provided means insuring an operation of the anti-creep mechanism either before or after the vehicle comes to a stop depending upon the adjustment of the mechanism; and an important object of my invention is to include, in this switch controlling means, a switch mechanism which is, without fail, operative to effect the desired operation of the relay switch at a certain time just before the vehicle comes to a stop and at a certain time just after the movement of the vehicle is initiated.

Yet another object of my invention is to provide a switch controlling mechanism controlled by a control member, i.e., a vehicle speed responsive governor operated switch, such that the switch to be controlled may be operated either before a certain event, for example, at a certain time before said control member comes to a stop, or at a certain time after said event, for example, at a certain time after said member comes to a stop or after said member is started, or at the same or substantially the same time as the happening of said event, for example at the same or substantially the same time said member comes to a stop.

A further object of my invention is to provide, in an automotive vehicle including a four-wheel brake mechanism, brake anti-creep means, including a valve or its equivalent, for controlling the operation of two of the wheel brakes of the mechanism preferably the two front brakes; together with means, responsive to the speed of rotation of two of the wheels preferably the two rear wheels of the vehicle, for controlling said valve.

A further object of my invention is to provide, in a four-wheel hydraulic brake system including a brake anti-creep mechanism, power operated time control means for controlling the operation of a control member of the anti-creep mechanism said time control mechanism including a power operated switch and means for controlling the operation of said switch including a time delay relay and means for controlling the operation of the coil of said relay; and another object of my invention is to include, in said latter control means, a plurality of sources of electricity such as a plurality of condensors, one of said sources acting as a means for storing electrical energy and serving to energize the relay coil and the second of said sources serving, in the main, to energize the latter source of electricity; and a further object of my invention is to provide intermittently operable means for energizing the aforementioned second source of electricity. An important feature of my invention is to so control the operation of this anti-creep mechanism that the same is, with a certain operation of the accelerator, ineffective to hold the brakes applied, that is inoperative for its intended purpose, in the operation of getting the vehicle under way and when the vehicle is traveling below a certain relatively low critical speed. With such a control the driver will not be handicapped by having an undesired holding of the brakes when operating the vehicle near a stop and go traffic sign.

A further object of my invention is to provide, in an automotive vehicle, a brake anti-creep mechanism which is operative to effect a holding of the brakes at or below a certain vehicle speed and with a certain operation of the accelerator, said holding operation being effected when the vehicle is being either accelerated or decelerated below said certain speed.

The above and other objects and features of the invention will appear more fully hereinafter from a consideration of the following description taken in connection with the acocmpanying drawings where one embodiment of the invention is illustrated by way of example.

Figure 1 is a diagrammatic view disclosing one embodiment of my invention employed as a part of the anti-creep mechanism of an automotive vehicle;

Figure 2 discloses the electrical hookup of the mechanism of Figure 1; and

Figure 3 is a sectional view disclosing details of the solenoid operated check valve of the mechanism of Figure 1.

There is disclosed in Figures 1 and 2 a preferred embodiment of my invention wherein my switch controlling mechanism is employed to control a well known type of brake mechanism of an automotive vehicle said mechanism including a well known type of anti-creep mechanism. This brake and anti-creep mechanism, no claim to which is made, includes a master cylinder 10 housing a piston, not shown, which is actuated as a result of the manual operation of a brake pedal 12. Depression of the brake pedal to apply the brakes energizes slave cylinders 14 which in turn actuate the brake shoes 16 of the wheel brakes of the vehicle. In this operation an incompressible or substantially incompressible brake fluid flows through conduits 18 and upon release of the brake pedal a certain mechanism including return springs, not shown, operates to return the parts of the mechanism to their brake off positions.

Briefly describing the anti-creep mechanism of the well known brake mechanism, a solenoid operated check valve 20, Figure 3, preferably inserted in the system to control the front brakes of the vehicle, operates, with a release of the brake pedal and after the energization of a grounded solenoid 22, to hold a predetermined back pressure against the slave cylinders, and thereby maintain a predetermined amount of braking effort on the front wheels of the automotive vehicle; however, said solenoid when de-energized serves to disable this valve and thereby disable the anti-creep mechanism. Describing the latter operation a spring loaded yieldable member 24, housed within the armature 26 of the solenoid, is normally spaced from an opening 28 in the pole piece 30 of the solenoid thereby making it possible for the brake fluid to freely return through an opening 32 in the check valve, the opening 28, and thence through a recess 34 in the armature 26 which recess extends into communication with the front face of the yieldable valve closure member 24, and on toward the master cylinder 10. The pole piece 30 is provided with an annular seat surrounding the opening 28 which projects rearwardly of the remaining portion of the pole piece, to permit a predetermined amount of yielding of the spring loaded yieldable memebr 24 before the armature 26 contacts the pole piece 30. Surrounding opening 28 in the pole piece 30 are a plurality of openings 60 (two of which are shown in section) which will at all times permit forward fluid flow to the wheel cylinders 14. The check valve 20 is provided with a rubber coating which covers these openings 60 preventing return flow through these openings. All of the return flow, therefore, passes through opening 28; and when the solenoid 22 is energized, its closure member 24 is biased against the opening 28 with a predetermined force. If the brakes have been applied when the solenoid 22 is actuated, a predetermined back pressure will be held in the wheel cylinders 14—any excess over and above this predetermined amount being relieved past the closure member 24.

In certain cars of the day the solenoid 22 is energized and de-energized, to operate the anti-creep portion of the brake mechanism, with an operation of a vehicle speed responsive governor operated switch; however this governor is somewhat uncertain in operation particularly as to its time of operation. Accordingly, it is the principal object of my invention to provide an efficient and effective means for controlling the time of operation of a switch mechanism, and said control means may, as indicated by an inspection of Figures 1 and 2, be substituted for the aforementioned vehicle speed responsive governor operated control switch of the anti-creep mechanism of the day.

Describing now the switch control means of Figures 1 and 2 there is provided a normally closed switch 34 of a solenoid operated relay 36; and this switch is preferably biased to its closed position by a spring 38. The solenoid coil 40 of the relay is electrically connected in series with a grounded battery 42, the ignition switch 44 of the vehicle, and an insulated contact 46 of a vehicle speed responsive single pole double throw governor switch 48 no claim to which is made. The common arm 50 of the switch 48, shown in its neutral position in Figure 2, is electrically connected in series with a condenser 52 of relatively low capacity, say 500 mfd., the ignition switch 44 and the battery 42; and an insulated contact 54 of the switch 48 is grounded at 55. The arm 50 of the switch 48 is preferably driven by cam means connected with the propeller shaft of the vehicle; accordingly the governor switch 48 is operative in accordance with the speed of the vehicle. Numerous cam arrangements can be made to operate the switch, one such arrangement may include a spring 59 to bias the pole in one direction, and a cam 37 to force the pole in the opposite direction, thereby causing the pole to alternately engage its opposite contacts. The normally closed relay switch 34 is electrically connected in series with the solenoid 22, a grounded accelerator operated breaker switch 53 which is closed when the accelerator is released, the ignition switch 44, and the grounded battery 42. Describing now one of the principal features of my invention, a condenser 56 of a high capacity, say 1500 mfd., is electrically connected in parallel with the relay coil 40; and a grounded accelerator operated switch 58 completes the electrical controls of my invention—said switch being electrically connected in series with the coil 40 and ignition switch 44 and being closed when the accelerator is depressed a relatively small amount. The relay 36 and condensers 52 and 56 may be housed within one container indicated by the reference numeral 51 in Figure 1.

Describing now in brief an operation of the embodiment of my invention disclosed in Figures 1 and 2, the mechanism is preferably so adjusted that the anti-creep mechanism is brought into play just before the car is stopped, that is during the so-called feathering operation of the brakes. Explaining this operation it is to be noted that the relay switch 34 is held open by an operation of the relay coil 40 said coil being energized by virtue of the discharging operation of the condensers 52 and 56, particularly the latter; and as set forth below, the condenser 56 is charged to maintain its voltage by the operation of the condenser 52. The rate of discharge of the condenser 56 and the resultant timing of operation of the switch 34 to render the anti-creep mechanism effective, may be controlled by a rheostat, not shown, connected in series with the contact 46 and switch 44 and by-passing the relay coil 40.

When the vehicle is placed in motion, the vehicle speed responsive breaker switch 48 immediately operates to charge the condenser 52 and this results, with a movement of the arm 50 of the switch 48 into contact with the contact 46, in a charging of the condenser 56 to effect an energization of the coil 40. The condenser 56 reaches its full charge when the speed of the vehicle is increased to a certain factor, say five miles per hour. Thereafter condenser 56 operates to maintain the energization of the coil 40; accordingly, the switch 34 is opened thereby rendering the anti-creep mechanism inoperative; however, when the speed of the car is reduced sufficiently to make the rate of discharge of the condenser 56 exceed the rate of charge thereof then there comes a time, preferably a very short time before the car comes to a stop say when the vehicle is traveling at two miles per hour, when the condenser 56 is discharged sufficiently to reduce the voltage across the relay coil 40 below its drop out value. The switch 34 is then automatically closed by the operation of the spring 38 thereby initiating an operation of the anti-creep mechanism. The relay coil 40 and condenser 56 are preferably wired in parallel in order to hold the relay energized during the half cycle of the breaker switch 48 in which the common arm 50 of the switch is in contact with the grounded side. In other words the common arm of the breaker switch shuttles electrical energy from the battery 42 to the relay 36, the condenser 56 serving to hold the relay energized while making the exchange. The condenser 56 is used to store the excess energy over that required by the relay coil.

Inasmuch as applicant uses a condenser arrangement for feeding direct current to the relay coil 40, the vehicle may be stopped in a position wherein the switch arm 50 remains in contact either with the contact 54 or the contact 46 without shorting out the battery. Prior art devices have necessitated switch structures which could not remain closed regardless of the position in which the vehicle was stopped. Applicant's switch structure 48 can therefore be much simpler and more inexpensive to manufacture than are the normally open switches which have been used heretofore in other types of no creep systems.

A further refinement of applicant's invention is to be found in the use of the accelerator operated switch 58, which switch is intended to energize the coil 40 whenever the accelerator pedal is moved out of its closed position. It is a property of relay coils generally that a larger flow of electrical energy is required through the coil to move its armature (or in this case the switch blade 34) from its remote position to its position engaging the core of the armature, than is required to hold the armature (or in this case the switch blade 34) in engagement with the core of the solenoid once it is so positioned. Without the use of the switch 58, a higher vehicle speed would be required to initially produce an opening of the switch 34, than is required to permit the switch blade 34 to separate from the relay coil 40 and close the switch 34. As for example, one form of relay 36 which has been used without the switch 58 required the vehicle to be accelerated to a speed of above approximately 5 miles per hour in order to open the switch 34; while deceleration of the vehicle below approximately 2 miles per hour was necessary before the switch 34 would again close. Without the switch 58 therefore, there was a range of vehicle speeds of from 2 to 5 miles per hour during which the no creep system may or may not be in operation depending upon whether the vehicle had been accelerated or decelerated to within this range.

By the use of the switch 58, the above mentioned range of from 2 to 5 miles per hour was eliminated so that the no creep system was always operable when the vehicle was moving above approximately 2 miles per hour. Referring to Figure 2 of the drawing it will be seen that an actuation of the accelerator pedal immediately causes the switch blade 34 to be opened such that the switch 34 will be held open by the speed responsive switch 48 whenever the vehicle is travelling above the lower limit, which in the above example was approximately 2 miles per hour. Switch 58 therefore assures that the no creep system will be disabled whenever a vehicle speed above a predetermined velocity is reached; and permits the operator to take his foot off of the accelerator pedal and apply the brakes in the range of from 2 to 5 miles per hour, such as may occur during a parking operation, without the brakes being held applied.

There is thus provided a simple, compact, and efficient time control means for controlling the operation of a brake anti-creep mechanism. The condenser 56 provides means for storing electrical power utilized to operate the anti-creep mechanism; and the condenser 52, by its operation of charging the condenser 56, insures an operation of the latter by maintaining a voltage across the relay coil above its drop out value. The operation of the condenser 52 may be likened unto the operation of a pump and the operation of the condenser 56 may be likened unto the operation of a storage tank in the operation of the mechanism of my invention. Described in other words the switch operating power means of my invention includes a motor such as the coil, that is electric motor 40 of the relay 36, means for energizing the motor including a source of power, that is the battery 42, a means for storing electricity flowing from the battery, that is the condenser 52, means for controlling the source of power such as the intermittently operated breaker switch 48, and means, such as the condenser 56, controlled by the breaker switch and operable to store electricity flowing from the condenser 52 said storing means being activated by the condenser 52 and operable as the principal means for energizing the motor. The accelerator operated switch 58 in cooperation with other parts of the mechanism including the battery 42, provide means for disabling the brake anti-creep mechanism when said switch is closed thereby insuring the desired operation of the brakes when the vehicle is being maneuvered in the vicinity of the traffic controls of the day.

The time of operation of the anti-creep mechanism with respect to the movement of the vehicle, that is the determination of whether or not the anti-creep mechanism comes into play before or after the car comes to a stop and when this operation is effected, may be controlled by a determination of any one or a plurality of many factors including the capacity of the condensers, the air gap of the relay 36, the resistance of the relay coil 40, the strength of the spring 38 and the speed of operation of the breaker switch 48. The latter may include a cam for operating the movable contact of the switch, accordingly the operation of the switch may be controlled by the number, size and position of the lobes on said cam.

The relay switch 34, that is the switch which is controlled, may also be employed in other arts; for example said switch may be employed to control the closure of the doors of an automotive bus and to control the operation of a transmission operating mechanism of an automotive vehicle to effect say a low gear setting of said mechanism; and to effect the latter operation of my invention the parts of the mechanism are preferably so constructed as to effect a closure of the switch 34 a short time prior to a stopping of the vehicle.

The switch control means of my invention also finds a place when used in an automotive vehicle including a fluid coupling combined with the above described hydraulic and anti-creep brake mechanism; and my invention may also be incorporated in the brake mechanism of a stamping press wherein it is desirable to employ a small inexpensive brake to maintain a relatively massive fly wheel or equivalent part of the press mechanism static. With the mechanism of my invention the brake is applied to the fly wheel of the stamping press after and only after said fly wheel has come to a stop; or the parts may be constructed and adjusted so that the brake is applied just before the fly wheel comes to a stop.

I claim:

1. In an automotive vehicle having a brake and an accelerator, a fluid pressure motor device for operating a brake on the vehicle, a pressure producing device, flow conducting means establishing fluid flow communication between said devices, an electrically controlled valve in said flow conducting means for restricting back flow from said fluid pressure motor to said pressure producing device when energized, normally closed solenoid operated switch means for energizing said valve, a single pole double throw switch the contacts of which are connected in the electrical supply circuit for the solenoid of said solenoid operated switch means, a first condenser in parallel circuit with respect to said solenoid, a second condenser connected between the pole of said single pole switch and the side of said first condenser opposite said switch, cam means for causing said pole of said switch to oscillate between its contacts, means for causing said cam means to rotate at a speed which increases with vehicle speed, spring means for causing said pole to follow the contour of said cam means, and switch means connected to said solenoid for deenergizing said solenoid upon depressing said accelerator.

2. In a speed control system for a movable device: a control mechanism having a normal position and a second position in which it performs a speed regulating function for said movable device, electrical control means of generally predetermined impedance causing said control mechanism to be held in its second position when an electrical flow above a generally predetermined rate passes therethrough and which causes said control mechanism to be in its normal position when said electrical flow rate decreases below said generally predetermined rate, a first electrical condenser connected to said electrical control means in such manner that a charge on said condenser decays through said electrical control means, a single pole double throw switch having two contacts between which the pole oscillates, an electrical supply circuit for said first condenser and connected in series with said contacts of said single pole switch, a second condenser one side of which is connected to the side of said first condenser opposite said contacts and the other side of said second condenser being connected to said pole of said single pole switch, rotary means for oscillating said pole piece between said contacts, and means rotating said rotary means generally proportional to the speed of said movable device, whereby said control mechanism is moved into its second position at a generally predetermined speed of said movable device.

3. In a speed control system for a movable device: a control mechanism having a normal position and a second position in which it performs a speed regulating function for said movable device, electrical control means including an actuating solenoid of generally predetermined impedance causing said control mechanism to be held in its second position when an electrical flow above a generally predetermined rate passes therethrough and which causes said control mechanism to be in its normal position when said electrical flow rate decreases below said generally predetermined rate, a first electrical condenser connected to said solenoid in such manner that a charge on said condenser decays through said solenoid, a single pole double throw switch having two contacts between which the pole oscillates, an electrical supply circuit for said first condenser and connected in series with said contacts of said single pole switch, a second condenser one side of which is connected to the side of said first condenser opposite said contacts and the other side of said second condenser being connected to said pole of said single pole switch, rotary means for oscillating said pole piece between said contacts, and means rotating said rotary means generally proportional to the speed of said movable device, whereby said control mechanism is moved into its second position at a generally predetermined speed of said movable device.

4. In a braking system for a rotatable mechanism: a brake for stopping rotation of the mechanism, electrical control means of generally predetermined impedance causing said brake to be held applied when an electrical flow below a generally predetermined rate passes through the control means and which causes the brake to be released when said electrical flow rate increases above said generally predetermined rate, a first electrical condenser connected to said electrical control means in such manner that a charge on said condenser decays through said electrical control means, an electrical supply circuit, a second condenser, cyclic switch means which when in one part of its cycle connects said second condenser to said electrical supply circuit and which in another part of its cycle is connected to said second condenser in a manner permitting a charge on said second condenser to be transferred to said first condenser, drive means cycling said cyclic switch means at a rate proportional to the speed of rotation of said rotatable mechanism, an accelerator lever having a normal position out of which said lever is moved to increase the speed of rotation of said rotatable mechanism, and means disabling said electrical control means from holding said brake applied when said accelerator lever is moved out of its normal position.

5. In a braking system for a rotatable mechanism: a brake for stopping rotation of the mechanism, electrical control means of generally predetermined impedance causing said brake to be held applied when an electrical flow below a generally predetermined rate passes through the control means and which causes the brake to be released when said electrical flow rate increases above said generally predetermined rate, a first electrical condenser connected to said electrical control means in such manner that a charge on said condenser decays through said electrical control means, a single pole double throw switch having two contacts between which the pole oscillates, an electrical supply circuit for said first condenser and connected in series with said contacts of said single pole switch, a second condenser one side of which is connected to the side of said first condenser opposite said contacts and the other side of said second condenser being connected to said pole of said single pole switch, rotary means for oscillating said pole between said contacts, means rotating said rotary means generally proportional to the speed of said mechanism, an accelerator lever having a normal position out of which said lever is moved to increase the speed of rotation of said rotatable mechanism, and means disabling said electrical control means from holding said brake applied when said accelerator lever is moved out of its normal position.

6. In a braking system for a rotatable mechanism: a brake for stopping rotation of the mechanism, electrical control means of generally predetermined impedance causing said brake to be held applied when an electrical flow below a generally predetermined rate passes through the control means and which causes the brake to be released when said electrical flow rate increases above said generally predetermined rate, a first electrical condenser connected to said electrical control means in such manner that a charge on said condenser decays through said electrical control means, an electrical supply circuit, a second condenser, cyclic switch means which when in one part of its cycle connects said second condenser to said electrical supply circuit and which in another part of its cycle is connected to said first condenser in a manner permitting a charge on said second condenser to be transferred to said first condenser, drive means cycling said cyclic switch means at a rate generally proportional to the speed of rotation of said rotatable mechanism, an accelerator lever having a normal position out of which said lever is moved to increase the speed of rotation of said rotatable mechanism, means disabling said electrical control means from holding said brake applied when said accelerator lever is moved out of its normal position, and means producing an electrical flow rate through said electrical control means greater than said generally predetermined rate when said accelerator is moved out of its normal position.

7. In a braking system for a rotatable mechanism: a brake for stopping rotation of the mechanism, electrical control means of generally predetermined impedance causing said brake to be held applied when an electrical flow below a generally predetermined rate passes through the control means and which causes the brake to be released when said electrical flow rate increases above said generally predetermined rate, a first electrical condenser connected to said electrical control means in such manner that a charge on said condenser decays through said electrical control means, a single pole double throw switch having two contacts between which the pole oscillates, an electrical supply circuit for said first condenser and connected in series with said contacts of said single pole switch, a second condenser one side of which is connected to the side of said first condenser opposite said contacts and the other side of said second condenser being connected to said pole of said single pole switch, rotary means for oscillating said pole between said contacts, means rotating said rotary means generally proportional to the speed of said mechanism, an accelerator lever having a normal position out of which said lever is moved to increase the speed of rotation of said rotatable mechanism, means disabling said electrical control means from holding said brake applied when said accelerator lever is moved out of its normal position, and means producing an electrical flow rate through said electrical control means greater than said generally predetermined rate when said accelerator is moved out of its normal position.

8. In a braking system for a rotatable mechanism: a brake for stopping rotation of the mechanism, a relay switch having a coil of generally predetermined impedance causing said brake to be held applied when an electrical flow below a generally predetermined rate passes through said coil and which causes the brake to be released when said electrical flow rate increases above said generally predetermined rate, a first electrical condenser connected in parallel with respect to said coil so that a charge on said condenser decays through said coil, a single pole double throw switch having two contacts between which the pole oscillates, an electrical supply circuit for said first condenser and connected in series with said coil and said contacts of said single pole switch, a second condenser one side of which is connected to the side of said first condenser opposite said contacts and the other side of said second condenser being connected to said pole of said single pole switch, rotary means for oscillating said pole between said contacts, means rotating said rotary means generally proportional to the speed of said mechanism, an accelerator lever having a normal position out of which said lever is moved to increase the speed of rotation of said rotatable mechanism, means disabling said relay switch from holding said brake applied when said accelerator lever is moved out of its normal position, and means producing an electrical flow rate through said coil of said relay switch greater than said generally predetermined rate when said accelerator is moved out of its normal position.

9. In a braking system for a rotatable mechanism: a brake for stopping rotation of the mechanism, a relay switch having a coil of generally predetermined impedance causing said brake to be held applied when an electrical flow below a generally predetermined rate passes through said coil and which causes the brake to be released when said electrical flow rate increases above said generally predetermined rate, a first electrical condenser connected in parallel with respect to said coil so that a charge on said condenser decays through said coil, a single pole double throw switch having two contacts between which the pole oscillates, an electrical supply circuit for said first condenser and connected in series with said coil and said contacts of said single pole switch, a second condenser one side of which is connected to the side of said first condenser opposite said contacts and the other side of said second condenser being connected to said pole of said single pole switch, rotary means for oscillating said pole between said contacts, means rotating said rotary means generally proportional to the speed of said mechanism, an accelerator lever having a normal position out of which said lever is moved to increase the speed of rotation of said rotatable mechanism, means disabling said relay switch from holding said brake applied when said accelerator lever is moved out of its normal position, and switch means connected in series with said relay coil and said electrical supply circuit and which switch means is closed by said accelerator lever when moved out of its normal position to produce an electrical flow rate through said relay coil above said generally predetermined rate.

References Cited in the file of this patent

UNITED STATES PATENTS

| | | |
|---|---|---|
| 2,114,016 | Dimond | Apr. 12, 1938 |
| 2,381,250 | Baumann | Aug. 7, 1945 |
| 2,397,123 | Brown | Mar. 26, 1946 |
| 2,530,749 | Yardeny | Nov. 21, 1950 |
| 2,573,196 | Harmon | Oct. 30, 1951 |
| 2,583,485 | Harmon et al. | Jan. 22, 1952 |